(12) United States Patent
Chen et al.

(10) Patent No.: US 10,749,954 B2
(45) Date of Patent: Aug. 18, 2020

(54) CROSS-DATA CENTER HIERARCHICAL CONSENSUS SCHEME WITH GEO-AWARE LEADER ELECTION

(71) Applicant: Futurewei Technologies, Inc., Plano, TX (US)

(72) Inventors: Shen Chi Chen, San Jose, CA (US); Liya Chen, San Jose, CA (US); Chen Tian, Union City, CA (US); Zongfang Lin, Santa Clara, CA (US); Robert Lasater, Menlo Park, CA (US)

(73) Assignee: Futurewei Technologies, Inc., Plano, TX (US)

( * ) Notice: Subject to any disclaimer, the term of this patent is extended or adjusted under 35 U.S.C. 154(b) by 386 days.

(21) Appl. No.: 15/385,475

(22) Filed: Dec. 20, 2016

(65) Prior Publication Data
US 2018/0176300 A1     Jun. 21, 2018

(51) Int. Cl.
*H04L 29/08* (2006.01)
*H04L 12/26* (2006.01)

(52) U.S. Cl.
CPC .......... *H04L 67/1095* (2013.01); *H04L 43/10* (2013.01); *H04L 67/1097* (2013.01)

(58) Field of Classification Search
CPC .............. H04L 67/1097; H04L 67/104; H04L 67/1095; H04L 67/2842; H04L 43/10
(Continued)

(56) References Cited

U.S. PATENT DOCUMENTS 6,327,622 B1 * 12/2001 Jindal .................. G06F 9/5055
                                                      709/228

6,434,559 B1 *  8/2002 Lundberg ................ H04L 47/10
(Continued)

FOREIGN PATENT DOCUMENTS

| CN | 103544303 | 1/2014 |
|---|---|---|
| CN | 104104739 | 10/2014 |
| CN | 105404701 | 3/2016 |

OTHER PUBLICATIONS

Leslie Lamport, "The Part-Time Parliament", May 1998, ACM Transactions on Computer Systems 16, 2 (May 1998), 133-169, dl.acm.org/citation.cfm?id=279229 (Year: 1998).*

(Continued)

*Primary Examiner* — Ruolei Zong
(74) *Attorney, Agent, or Firm* — Schwegman Lundberg & Woessner, P.A.

(57) ABSTRACT

A device comprises a non-transitory memory storage comprising instructions, a network interface, and one or more processors in communication with the memory storage and the network interface. The one or more processors execute the instructions to receive, via the network interface, a write request from a client device; send, via the network interface, the received write request to a set of follower devices; receive, via the network interface, a first acknowledgment from a majority of the follower devices of the set of follower devices that the write request was processed; send, via the network interface, the received write request to a set of peer devices; receive, via the network interface, second acknowledgments from a majority of the set of peer devices that the write request was processed; and send an acknowledgment of the write request to the client device in response to the receipt of the first acknowledgments and the second acknowledgments.

20 Claims, 9 Drawing Sheets

(58) Field of Classification Search
USPC .......................................................... 709/224
See application file for complete search history.

(56) References Cited

U.S. PATENT DOCUMENTS

| | | | |
|---|---|---|---|
| 2002/0184572 A1 | 12/2002 | Lal | |
| 2016/0100006 A1* | 4/2016 | Markus | H04L 67/1097 709/219 |
| 2016/0316011 A1* | 10/2016 | Venkataraman | H04L 67/1095 |
| 2016/0321150 A1* | 11/2016 | Dankberg | G06F 11/2069 |
| 2017/0085637 A1* | 3/2017 | Cencini | H04L 67/1042 |
| 2017/0364273 A1* | 12/2017 | Schreter | G06F 3/065 |
| 2017/0364417 A1* | 12/2017 | Schreter | G06F 11/1471 |
| 2017/0366451 A1* | 12/2017 | Schreter | H04L 45/28 |
| 2018/0150316 A1* | 5/2018 | Oh | G06F 9/485 |

OTHER PUBLICATIONS

Diego Ongaro, et al. "In Search of an Understandable Consensus Algorithm", 2014, Proceedings of USENIX ATC '14: 2014 USENIX Annual Technical Conference, web.stanford.edu/~ouster/cgi-bin/papers/raft-atc14 (Year: 2014).*

Moraru, Iulian, et al., "There Is More Consensus in Egalitarian Parliaments", SOSP '13, Nov. 3-6, 2013, Farmington, Pennsylvania, (Nov. 3, 2013), 358-372.

"International Application Serial No. PCT CN2017 114825, International Search Report dated Feb. 24, 2018", 4 pgs.

"International Application Serial No. PCT CN2017 114825, Written Opinion dated Feb. 24, 2018", 4 pgs.

* cited by examiner

CROSS-DATA CENTER HIERARCHICAL CONSENSUS SCHEME WITH GEO-AWARE LEADER ELECTION

TECHNOLOGICAL FIELD

The present disclosure is related to maintaining data consistency among data centers, and in particular to hierarchical consensus schemes with geographically-aware leader election to maintain data consistency among data centers.

BACKGROUND

To support cloud computing, geographically distributed data centers providing data storage are often used. Each data center includes one or more servers at a physical location. Geographically distributed data centers provide fault tolerance capability using data replicas. For example, if one data center is down, the remaining data centers still provide data to users. One risk of replicated data is a lack of consistency. A user should get the same result for a data request regardless of which data center the request is sent to.

Consensus involves multiple servers within a single data center or distributed data centers agreeing on values. Once a consensus decision on a value is reached, that decision is final. To achieve consensus, all instructions that write data must be executed in the same order.

A non-leader-based approach, e.g., Paxos, is one type of algorithm that provides for consensus. In Paxos, a data center that receives a request to write a value first proposes a "prepare" request to all data centers where the value is to be written. Once a majority of data centers respond with a "promise" that the write will be processed, an "accept" request needs to be sent to all of the data centers. Once a majority of data centers accept that the write is complete, a confirmation may be sent to the requester. Thus, two round-trip communications are required between the data centers to achieve consensus in the write.

A leader-based approach, e.g., Raft, is another type of algorithm that provides for consensus. In Raft, a single data center is the leader and all read and write requests are directed to the leader. The remaining data centers are followers. The leader sends each read and write request to the followers and proceeds with a response to the request once a majority of followers have confirmed receipt. Unlike in Paxos, only a single round-trip communication is required to achieve consensus. However, since a single data center is the leader, all client requests must be directed to the leader rather than to the data center nearest to the client.

SUMMARY

A device comprises a non-transitory memory storage comprising instructions, a network interface, and one or more processors in communication with the memory storage and the network interface. The one or more processors execute the instructions to receive, via the network interface, a write request from a client device; send, via the network interface, the received write request to a set of follower devices; receive, via the network interface, a first acknowledgment from a majority of follower devices of the set of follower devices that the write request was processed; send, via the network interface, the received write request to a set of peer devices; receive, via the network interface, second acknowledgments from a majority of the set of peer devices that the write request was processed; and send an acknowledgment of the write request to the client device in response to the receipt of the first acknowledgments and the second acknowledgments.

A computer-implemented method for maintaining data consistency across multiple data centers includes receiving, by one or more processors and via a network interface, a write request from a client device; sending, by the one or more processors and via the network interface, the received write request to a set of follower devices; receiving, by the one or more processors and via the network interface, a first acknowledgment from a majority of follower devices of the set of follower devices that the write request was processed; sending, by the one or more processors and via the network interface, the received write request to a set of peer devices; receiving, by the one or more processors and via the network interface, second acknowledgments from a majority of the set of peer devices that the write request was processed; and in response to the receipt of the first acknowledgments and the second acknowledgments, sending an acknowledgment of the write request to the client device.

A non-transitory computer-readable medium stores computer instructions that, when executed by one or more processors, cause the one or more processors to perform steps of receiving, via a network interface, a write request from a client device; sending, via the network interface, the received write request to a set of follower devices; receiving, via the network interface, a first acknowledgment from a majority of follower devices of the set of follower devices that the write request was processed; sending, via the network interface, the received write request to a set of peer devices; receiving, via the network interface, second acknowledgments from a majority of the set of peer devices that the write request was processed; and in response to the receipt of the first acknowledgments and the second acknowledgments, sending an acknowledgment of the write request to the client device.

In example 1, a device comprises: a non-transitory memory storage comprising instructions; a network interface; and one or more processors in communication with the memory storage and the network interface, wherein the one or more processors execute the instructions to: receive, via the network interface, a write request from a client device; send, via the network interface, the received write request to a set of follower devices; receive, via the network interface, a first acknowledgment from a majority of follower devices of the set of follower devices that the write request was processed; send, via the network interface, the received write request to a set of peer devices; receive, via the network interface, second acknowledgments from a majority of the set of peer devices that the write request was processed; and send an acknowledgment of the write request to the client device in response to the receipt of the first acknowledgments and the second acknowledgments.

In example 2, a device comprises the device of example 1, wherein the one or more processors further execute the instructions to: prior to receiving at least one of the second acknowledgments: receive, via the network interface, from a first peer device of the set of peer devices, a prior write request; process the prior write request; and send, via the network interface, an acknowledgment of the prior write request.

In example 3, a device comprises the device of examples 1 or 2, wherein the one or more processors further execute the instructions to: determine that a leader device is not available; send, via the network interface, first usage data to each follower device of the set of follower devices; receive, via the network interface, second usage data from each follower device of the set of follower devices; and become a replacement leader device based on the first usage data and the second usage data.

In example 4, a device comprises the devices of examples 1 to 3, wherein: the one or more processors further execute the instructions to: receive, via the network interface, leader requests from a majority of the follower devices of the set of follower devices; and the becoming of the replacement leader device is further based on the receipt of the leader requests.

In example 5, a device comprises the devices of examples 1 to 4, wherein the determining that the leader device is not available comprises detecting that a heartbeat signal from the leader device has not been received.

In example 6, a device comprises the devices of examples 1 to 5, wherein: the one or more processors further execute the instructions to: receive, via the network interface, first leader requests from less than a majority of the follower devices of the set of follower devices; resend, via the network interface, the first usage data to each follower device of the set of follower devices in response to an elapse of a predetermined period of time without detecting a message from a replacement leader device; and receive, via the network interface, second leader requests from a majority of the follower devices of the set of follower devices; and the becoming of the replacement leader device is further based on the receipt of the second leader requests.

In example 7, a device comprises the devices of examples 1 to 6, wherein: an average geographic distance from the device to each of the follower devices of the set of follower devices is less than an average geographic distance from the device to each of the peer devices of the set of peer devices.

In example 8, a computer-implemented method for maintaining data consistency across multiple data centers comprises: receiving, by one or more processors and via a network interface, a write request from a client device; sending, by the one or more processors and via the network interface, the received write request to a set of follower devices; receiving, by the one or more processors and via the network interface, a first acknowledgment from a majority of follower devices of the set of follower devices that the write request was processed; sending, by the one or more processors and via the network interface, the received write request to a set of peer devices; receiving, by the one or more processors and via the network interface, second acknowledgments from a majority of the set of peer devices that the write request was processed; and in response to the receipt of the first acknowledgments and the second acknowledgments, sending an acknowledgment of the write request to the client device.

In example 9, a method comprises the method of example 8, further comprising: prior to receiving at least one of the second acknowledgments: receiving, via the network interface, from a first peer device of the set of peer devices, a prior write request; processing the prior write request; and sending, via the network interface, an acknowledgment of the prior write request.

In example 10, a method comprises the method of examples 8 or 9, further comprising: determining that a leader device is not available; sending, via the network interface, first usage data to each follower device of the set of follower devices; receiving, via the network interface, second usage data from each follower device of the set of follower devices; and based on the first usage data and the second usage data, becoming a replacement leader device.

In example 11, a method comprises the method of examples 8 to 10, further comprising: receiving, via the network interface, leader requests from a majority of the follower devices of the set of follower devices; and wherein the becoming of the replacement leader device is further based on the receipt of the leader requests.

In example 12, a method comprises the method of examples 8 to 11, wherein the determining that the leader device is not available comprises detecting that a heartbeat signal from the leader device has not been received.

In example 13, a method comprises the method of examples 8 to 12, further comprising: receiving, via the network interface, first leader requests from less than a majority of the follower devices of the set of follower devices; in response to an elapse of a predetermined period of time without detecting a message from a replacement leader device, resending, via the network interface, the first usage data to each follower device of the set of follower devices; and receiving, via the network interface, second leader requests from a majority of the follower devices of the set of follower devices; and wherein the becoming of the replacement leader device is further based on the receipt of the second leader requests.

In example 14, a method comprises the method of examples 8 to 13, wherein: an average geographic distance from the network interface to each of the follower devices of the set of follower devices is less than an average geographic distance from the network interface to each of the peer devices of the set of peer devices.

In example 15, a non-transitory computer-readable medium stores computer instructions that, when executed by one or more processors, cause the one or more processors to perform steps of: receiving, via a network interface, a write request from a client device; sending, via the network interface, the received write request to a set of follower devices; receiving, via the network interface, a first acknowledgment from a majority of follower devices of the set of follower devices that the write request was processed; sending, via the network interface, the received write request to a set of peer devices; receiving, via the network interface, second acknowledgments from a majority of the set of peer devices that the write request was processed; and in response to the receipt of the first acknowledgments and the second acknowledgments, sending an acknowledgment of the write request to the client device.

In example 16, a non-transitory computer-readable medium comprises the non-transitory computer-readable medium of example 15, wherein the steps further comprise: prior to receiving at least one of the second acknowledgments: receiving, via the network interface, from a first peer device of the set of peer devices, a prior write request; processing the prior write request; and sending, via the network interface, an acknowledgment of the prior write request.

In example 17, a non-transitory computer-readable medium comprises the non-transitory computer-readable medium of example 15 or example 16, wherein the steps further comprise: determining that a leader device is not available; sending, via the network interface, first usage data to each follower device of the set of follower devices; receiving, via the network interface, second usage data from each follower device of the set of follower devices; and based on the first usage data and the second usage data, becoming a replacement leader device.

In example 18, a non-transitory computer-readable medium comprises the non-transitory computer-readable medium of examples 15 to 17, wherein: the steps further comprise: receiving, via the network interface, leader requests from a majority of the follower devices of the set of follower devices; and the becoming of the replacement leader device is further based on the receipt of the leader requests.

In example 19, a non-transitory computer-readable medium comprises the non-transitory computer-readable medium of examples 15 to 18, wherein the determining that the leader device is not available comprises detecting that a heartbeat signal from the leader device has not been received.

In example 20, a non-transitory computer-readable medium comprises the non-transitory computer-readable medium of examples 15 to 19, wherein: the steps further comprise: receiving, via the network interface, first leader requests from less than a majority of the follower devices of the set of follower devices; in response to an elapse of a predetermined period of time without detecting a message from a replacement leader device, resending, via the network interface, the first usage data to each follower device of the set of follower devices; and receiving, via the network interface, second leader requests from a majority of the follower devices of the set of follower devices; and the becoming of the replacement leader device is further based on the receipt of the second leader requests.

DETAILED DESCRIPTION

In the following description, reference is made to the accompanying drawings that form a part hereof, and in which are shown by way of illustration specific embodiments which may be practiced. These embodiments are described in sufficient detail to enable those skilled in the art to practice the invention, and it is to be understood that other embodiments may be utilized and that structural, logical, and electrical changes may be made without departing from the scope of the present invention. The following description of example embodiments is, therefore, not to be taken in a limiting sense, and the scope of the present invention is defined by the appended claims.

The functions or algorithms described herein may be implemented in software in one embodiment. The software may consist of computer-executable instructions stored on computer-readable media or a computer-readable storage device such as one or more non-transitory memories or other types of hardware-based storage devices, either local or networked. The software may be executed on a digital signal processor, application-specific integrated circuit (ASIC), field-programmable gate array (FPGA), microprocessor, or other type of processor operating on a computer system, such as a personal computer, server, or other computer system, turning such a computer system into a specifically programmed machine.

A cross-data center hierarchical consensus scheme is proposed. In this scheme, data centers that are near to each other are grouped into clusters that each maintain consensus using a leader-based approach, e.g., a raft. Thus, a client device needing to communicate with a data center communicates with the leader of the cluster, which achieves consensus with the other data centers in the cluster. The clusters may achieve consensus with each other using a peer-to-peer relationship. In some example embodiments, cluster leaders are selected based on frequency of use by clients.

Figure 1:
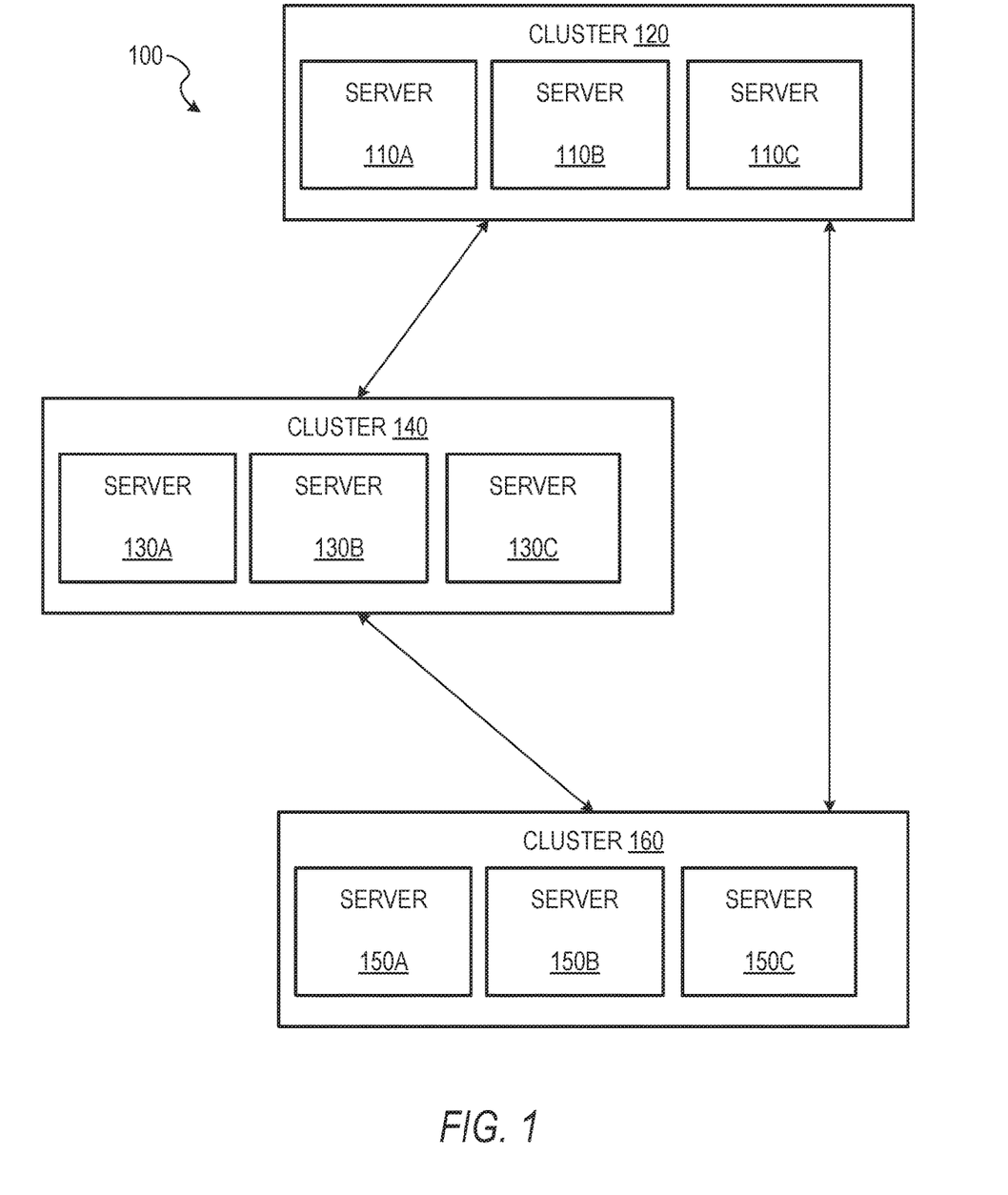
FIG. 1 is a block diagram illustrating an organization of servers suitable for implementation of a cross-data center hierarchical consensus scheme with geo-aware leader election, according to some example embodiments.

FIG. 1 is a block diagram illustrating an organization of servers 100 suitable for implementation of a cross-data center hierarchical consensus scheme with geo-aware leader election, according to some example embodiments. Servers 110A-110C, 130A-130C, and 150A-150C maintain replicated data for access by client devices. The servers 110A-110C, 130A-130C, 150A-150C are organized into three clusters 120, 140, and 160. The servers within each cluster are located in one or more data centers. Consensus regarding data on the servers within a cluster is maintained by identification of one server within each cluster as a leader. The remaining servers in each cluster are followers. Each read or write request by a client to a leader is handled by the leader after confirming that a majority of the followers will also process the request. Once the majority of followers has acknowledged the request, the leader may proceed on the basis that local consensus has been achieved. As used herein, local consensus refers to consensus within a cluster. Queries by a client to a follower are redirected to the leader. In some example embodiments, the data centers within a cluster are geographically clustered together relative to the geographic distances between clusters. For example, servers in a plurality of data centers in California may be clustered in one cluster, servers in a plurality of data centers in New York clustered in another cluster, and servers in a plurality of data centers in Shanghai clustered in a third cluster. In these embodiments, the average geographic distance from the leader of each cluster to its followers is less than the average geographic distances between the leaders of the clusters.

Consensus among the clusters is maintained by broadcasting the request from the leader receiving the request to the leaders of the other clusters. The non-leader based consensus approach (shown in FIG. 6) is used to obtain consensus among the leaders of clusters. After the originating leader receives a commit acknowledgment in response to the broadcast request from a majority of the leaders (including itself), the originating leader sends asynchronous commit messages to the other leaders.

Those leaders follow the leader-based approach (e.g. Raft) to propagate the request to their followers and acknowledge the request to the originating leader. Once a majority of the other leaders have acknowledged the request, the originating leader may proceed on the basis that global consensus has been achieved. As used herein, global consensus refers to consensus within the entire hierarchical system.

Figure 2:
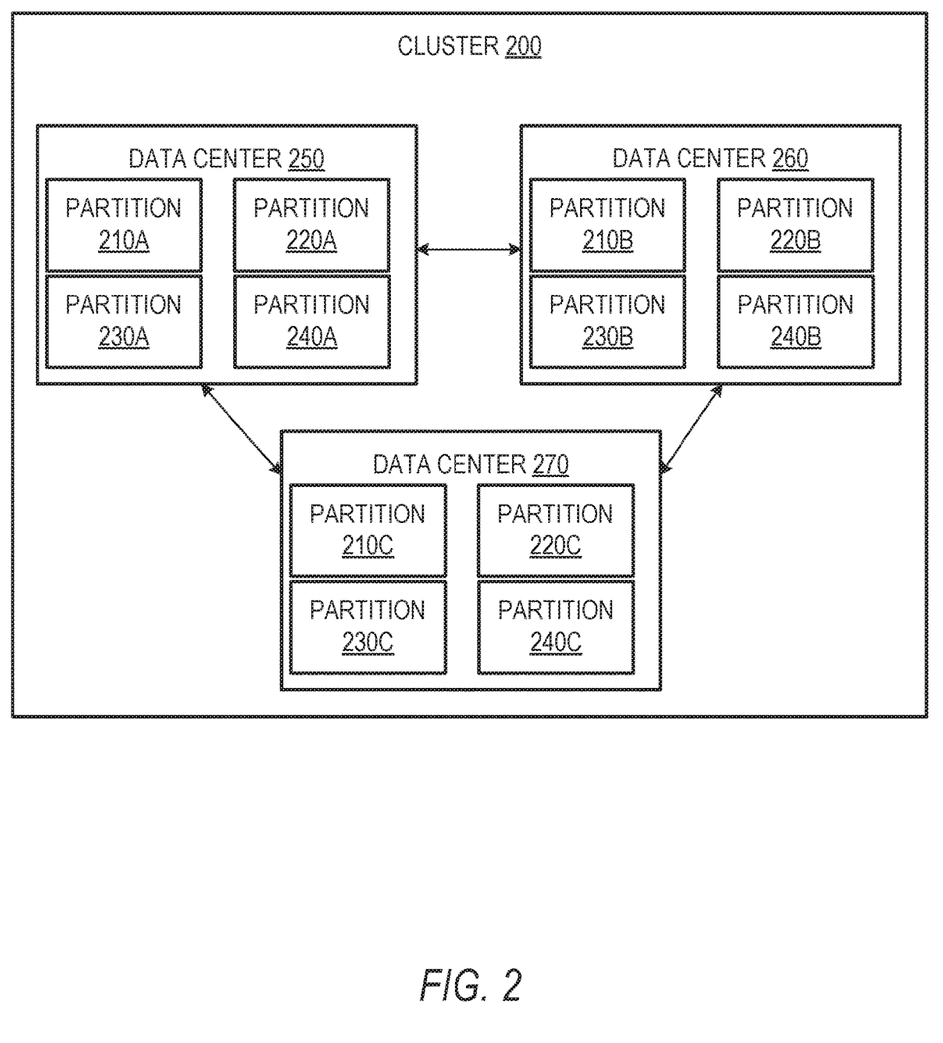
FIG. 2 is a block diagram illustrating an organization of data partitions in a cluster suitable for implementation of a cross-data center hierarchical consensus scheme with geo-aware leader election, according to some example embodiments.

FIG. 2 is a block diagram illustrating an organization of data partitions in a cluster 200 suitable for implementation of a cross-data center hierarchical consensus scheme with geo-aware leader election, according to some example embodiments. The cluster 200 includes data centers 250, 260, and 270. Each data center includes four partitions, the data center 250 includes partitions 210A-240A, the data center 260 includes partitions 210B-240B, and the data center 270 includes partitions 210C-240C. Each partition is formed of one or more servers, and contains a portion of the data for the associated data center. Corresponding partitions in each data center store the same portion of data. For example, partitions 210A, 210B, and 210C each replicate the same data. Thus, leaders for each set of corresponding partitions may be selected separately. For example, partition 210A may be the leader for the 210 partition, partition 220B may be the leader for the 220 partition, and partition 230C may be the leader for the 230 partition. Having different data centers act as leaders for different partitions may help balance network traffic or provide improved responsiveness.

FIGS. 3A-3D are block diagrams illustrating communication among servers suitable for implementation of a cross-data center hierarchical consensus scheme with geo-aware leader election, according to some example embodiments.

Figure 3A:
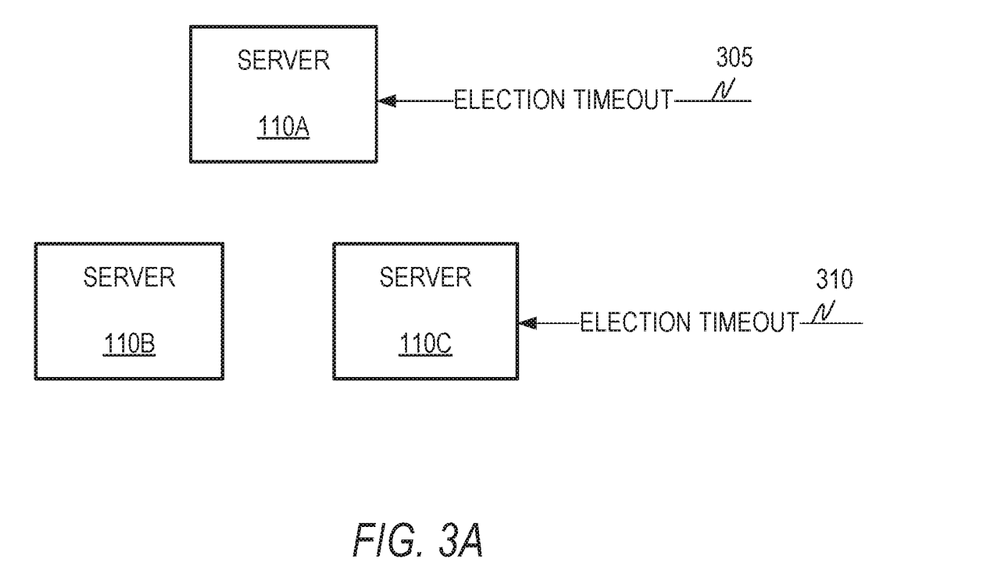
FIGS. 3A-3D are block diagrams illustrating communication among servers suitable for implementation of a cross-data center hierarchical consensus scheme with geo-aware leader election, according to some example embodiments.

In FIG. 3A, the servers 110A and 110C recognize after a timeout period that the cluster 120 (shown in FIG. 1) no longer has a leader, generating internal election timeout events 305 and 310. In response to the election timeout events 305 and 310, the servers 110A and 110 (become "leader candidates."

Figure 3B:
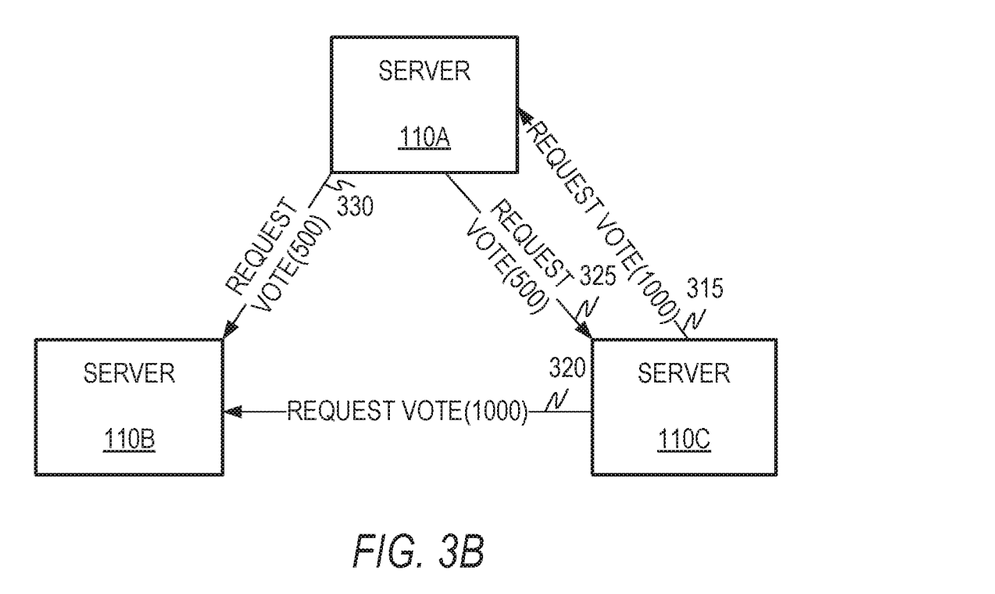

In FIG. 3B, the servers 110A and 110C generate leader requests in the form of requestVote( ) messages, including a parameter of the number of client requests each server has received since the previous leader was selected. Thus, the requestVote( ) messages 325 and 330, sent by the server 110A to the other servers 110B and 110C in the cluster 120, include the parameter 500, indicating that the server 110A has received 500 requests since the previous leader election. Similarly, the requestVote( ) messages 315 and 320, sent by the server 110C, include the parameter 1000, indicating that the server 110C has received 1000 requests since the previous leader election. In various example embodiments, the parameter is a number of requests over a set time period (e.g., 1 day, 1 week, or 1 hour) rather than since the last leader election. Furthermore, in various example embodiments, one or more parameters may be used that indicate usage data, supporting more complex algorithms for determining which potential leader to vote for. Usage data includes anything regarding the usage of the device requesting votes, such as the number of requests in a time period, the number of different client devices originating requests in a time period, the number of different users originating requests in a time period, the number of high-priority devices or users originating requests in a time period, uptime in a time period, downtime in a time period, similar values for a different time period, or any suitable combination thereof.

Figure 3C:
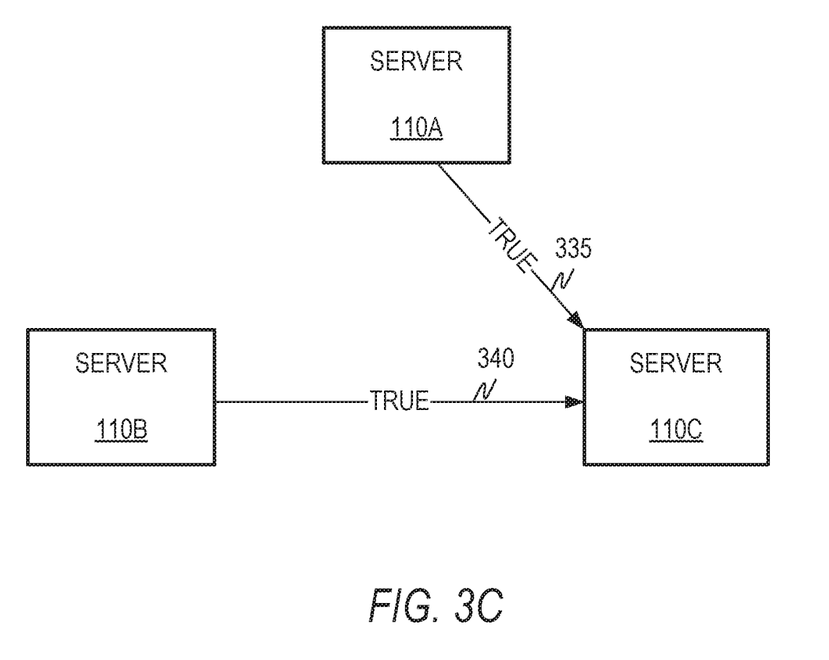

In FIG. 3C, the servers 110A and 110B respond with "True" responses 335, 340 to the requestVote( ) messages 315 and 320, respectively. The "True" response indicates that the sending server requests the receiving server to become the replacement leader. The servers 110A and 110B respond "True" to the server 110C because the parameter sent by the server 110C is greater than the parameter sent by any other server.

Figure 3D:
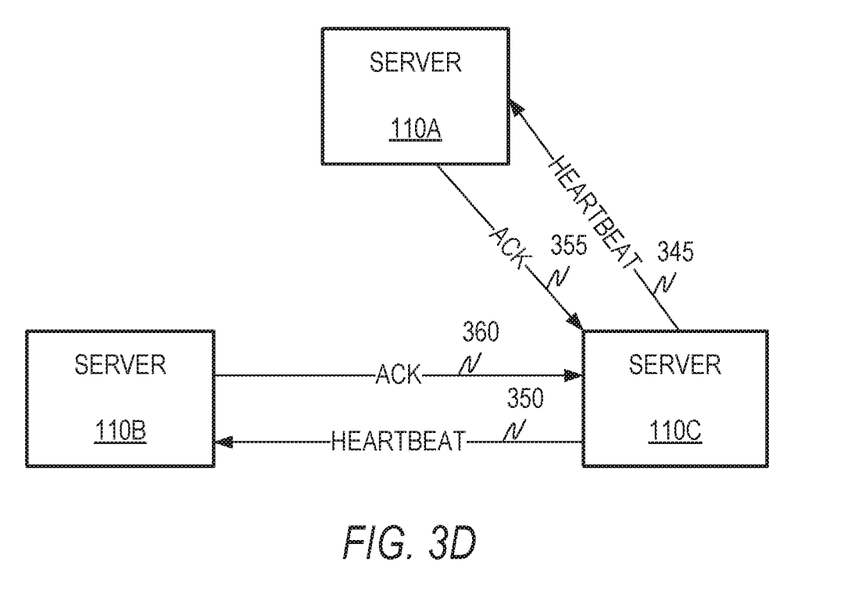

In FIG. 3D, the server 110C has become the replacement leader for the cluster 120. The server 110C periodically sends a heartbeat signal 345, 350 to the servers 110A and 110B. In response, the servers 110A and 110B send acknowledgment signals 355, 360. If the heartbeat signal is not received for longer than a predetermined period of time (e.g., 200 ms), followers not receiving the heartbeat signal will restart the leader selection process, causing the leader request messages to be resent. If an acknowledgment signal is not received by the leader for longer than a predetermined period of time (e.g., 1 s), the leader will assume that the follower from which it is not receiving the acknowledgment signal is no longer connected and cease attempting to achieve consensus with the follower.

In some cases, a follower may respond with a vote before it receives all vote requests. As a result, it may vote for a server having the highest parameter of the servers from which a vote request has been received, but that is not the server with the highest parameter among all vote requesters. In this case, a leader candidate may receive less than a majority of votes. For example, in a cluster with five servers, three servers may request votes. Due to voting with only partial information, the five votes may be split among the three servers, with no single server receiving a majority. When this occurs, each vote-requesting server will initially assume that a different server won the vote. However, since no server actually won the vote, no server will take the role of leader and begin sending a heartbeat signal. Accordingly, the timeout process and vote-request process will repeat. During the repeat, previously received vote requests may be cached, ensuring that only the server with the most client requests is voted for the second time. The cache may be cleared after a predetermined period of time, so that a cached request by a busy would-be leader that becomes disconnected between vote requests does not prevent another leader from being selected.

Figure 4:
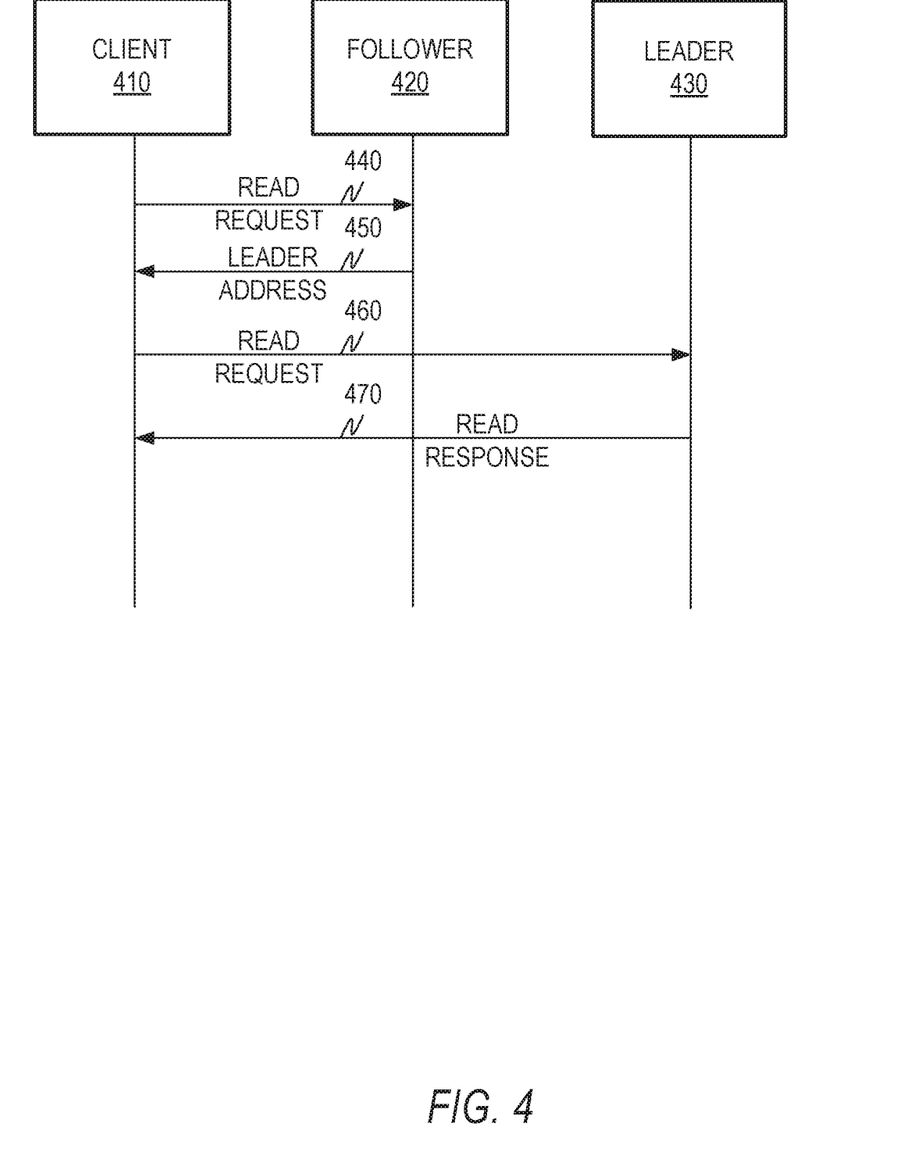
FIG. 4 is a block diagram illustrating communication between a client and servers suitable for implementation of a cross-data center hierarchical consensus scheme with geo-aware leader election, according to some example embodiments.

FIG. 4 is a block diagram illustrating communication between a client 410 and a follower 420 and a leader 430 suitable for implementation of a cross-data center hierarchical consensus scheme with geo-aware leader election, according to some example embodiments.

In a communication 440, the client 410 sends a read request to the follower 420 in a cluster (e.g., a raft). The follower 420 responds with a communication 450, which includes the address of the leader 430.

The client 410 sends a communication 460 to the leader 430 to request the data from the leader 430. Since all write requests for the cluster are processed directly by the leader 430, the leader 430 can respond to the read request with the requested data in a communication 470 without having to first confirm consensus within the cluster.

Figure 5:
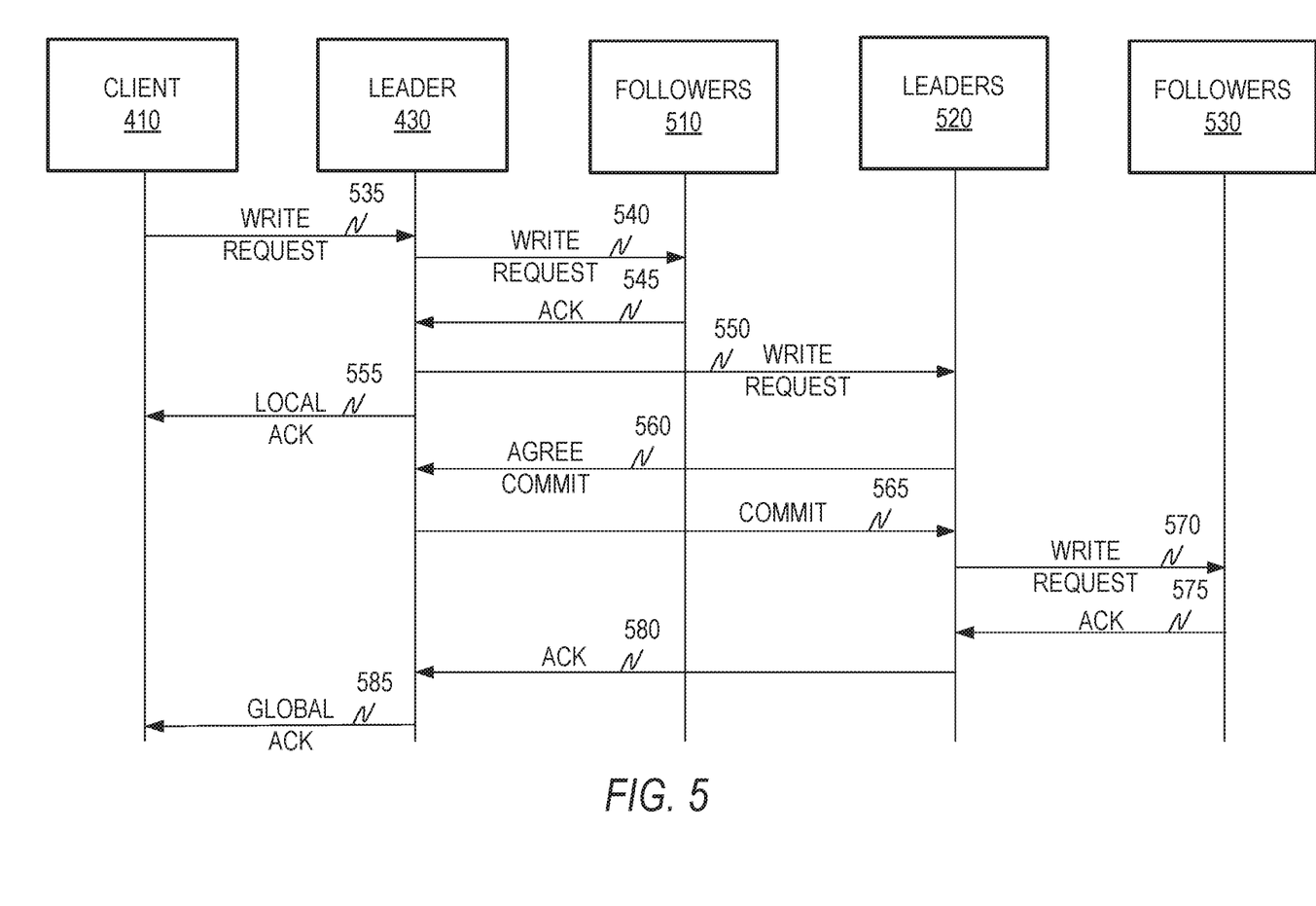
FIG. 5 is a block diagram illustrating communication among a client and servers suitable for implementation of a cross-data center hierarchical consensus scheme with geo-aware leader election, according to some example embodiments.

FIG. 5 is a block diagram illustrating communication among a client 410, leaders 430 and 520, and followers 510 and 530 suitable for implementation of a cross-data center hierarchical consensus scheme with geo-aware leader election, according to some example embodiments. The leader 430 is in the same cluster as the followers 510; the leaders 520 are in the same clusters as the followers 530. In FIG. 5, time proceeds from top to bottom.

In a communication 535, the client 410 sends a write request to the leader 430 (e.g., the server 110A) in a cluster (e.g., the cluster 120). The leader 430 sends the write request to the followers 510 (e.g., the servers 110B and 110C) in the cluster via a write request 540. The leader 430 also sends a write request communication 550 to the leaders 520 (e.g., the leaders in the clusters 140 and 160). The write request communication 550 may be sent prior to, after, or at the same time as the write request communication 540. In some example embodiments, consensus within the cluster of the leader 430 and among the clusters are determined in parallel. In other example embodiments, consensus within the cluster of the leader 430 is achieved prior to attempting to achieve consensus among the clusters. Once a majority of the followers 510 have sent acknowledgment communications 545 to the leader 430, the leader 430 optionally responds with a local acknowledgment communication 555 to the client 410. The local acknowledgment informs the client 410 that the write request has been processed by the local cluster. Once a client receive the local acknowledgement communication 555 for the write request, the guarantee of eventual consistency is complete. As a result, the updated commit value may be read from the local cluster (120).

Figure 6:
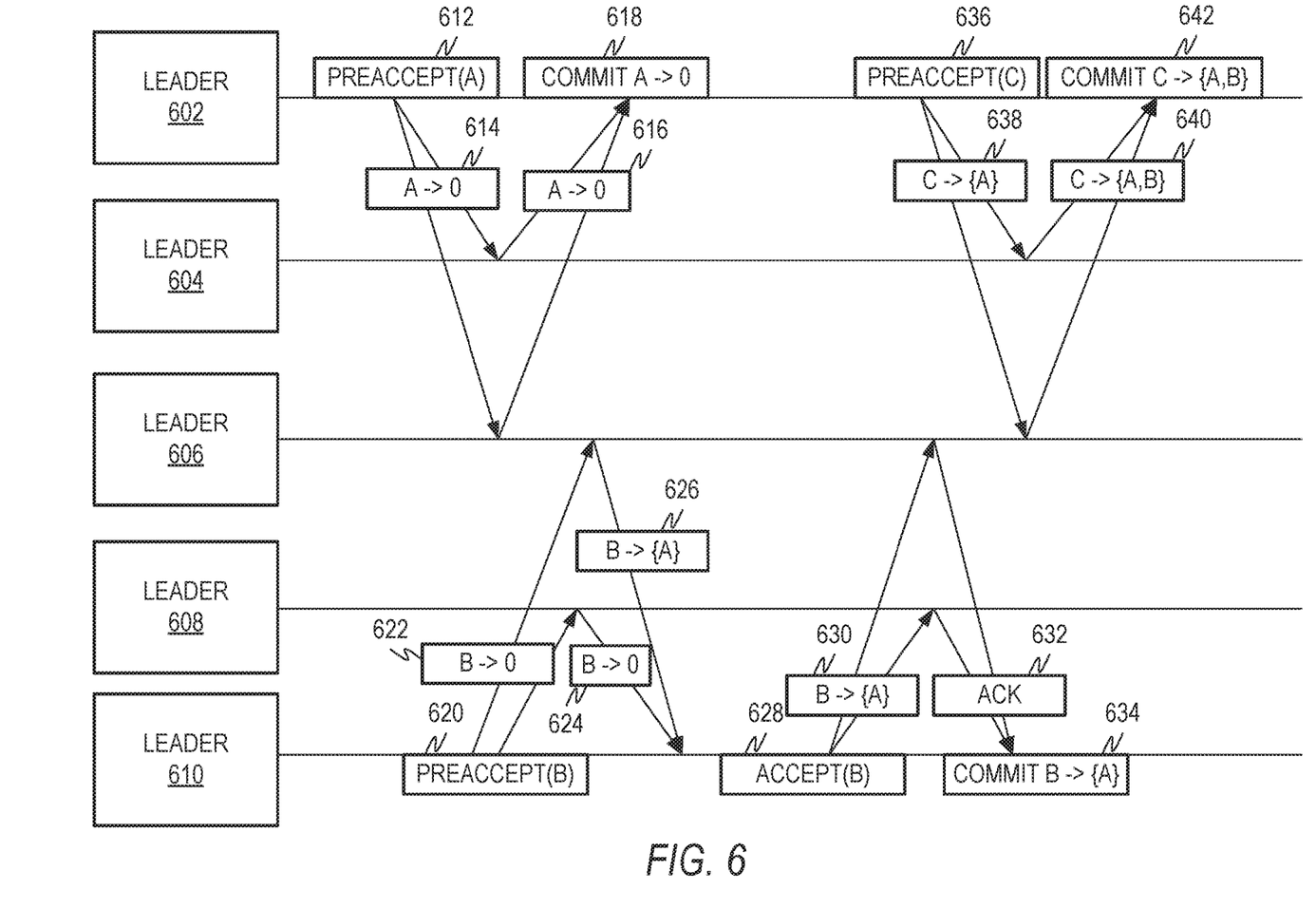
FIG. 6 is a block diagram illustrating communication among servers suitable for implementation of a cross-data center hierarchical consensus scheme with geo-aware leader election, according to some example embodiments.

The leaders 520 respond to the write request communication 550 using a peer-to-peer consensus protocol such as that shown in FIG. 6. Accordingly, if there is no disagreement as to the ability of the write request to be handled (e.g., due to intervening requests processed by a majority of the leaders 520), each of the leaders 520 respond with agree commit communication 560, indicating an agreement to commit the write request if a majority of the leaders 520 agree.

Once a majority of the leaders (the leaders 520 plus the leader 430) have agreed to commit the write request and local consensus has been reached (e.g., local acknowledgment communication 555 has been sent) the leader 430 sends a commit communication 565 to the leaders 520. To avoid the possibility that remote clusters complete the request and the local cluster does not, the commit communication 565 is not sent u The leaders 520 ensure local consensus within their clusters using the same process used by the leader 430 to ensure consensus by its followers 510. That is, each of the leaders 520 sends the write request via a communication 570 to its followers 530. As each follower processes the write request, the follower sends an acknowledgment to its leader via a communication 575. Once local consensus has been achieved by each of the leaders 520, that leader sends an acknowledgment communication 580 to the leader 430.

After a majority of the leaders 520 have acknowledged committing the write request via the acknowledgment communication 580, the leader 430 sends a global acknowledgment communication 585 to the client 410. The global acknowledgment informs the client 410 that the write request has been processed by the cross-data center hierarchy. When the client receives the global acknowledgement communication 585, strong consistency is achieved.

FIG. 6 is a block diagram illustrating communication among servers suitable for implementation of a cross-data center hierarchical consensus scheme with geo-aware leader election, according to some example embodiments. In FIG. 6, some communications among five leaders 602-610 (e.g., leaders of five rafts) are shown, with time proceeding from left to right.

In operation 612, the leader 602 pre-accepts a transaction (e.g., a write) A. The leader 602 sends pre-accept requests 614 to each of the other leaders 604-610. FIG. 6 shows only the pre-accept requests 614 sent to the leaders 604 and 606; it may be presumed that the requests eventually reach the leaders 608 and 610, but are delayed. The pre-accept requests 614 indicate that the transaction A has no dependencies on other transactions that the leader 602 is aware of. The leaders 604 and 606, not being aware of any dependencies themselves, each respond with an agreement 616 that the transaction A can be committed without requiring any other transactions to be committed first. After receiving agreements from a majority of the leaders (including itself), the leader 602 proceeds to commit the transaction A in operation 618 and to send asynchronous commit messages to the other leaders 604-610.

In operation 620, the leader 610 pre-accepts a transaction B. The leader 610 sends pre-accept requests 622 to each of the other leaders 602-608. FIG. 6 shows only the pre-accept requests 622 sent to the leaders 606 and 608; it may be presumed that the requests eventually reach the leaders 602 and 604, but are delayed. The pre-accept requests 622 indicate that the transaction B has no dependencies on other transactions that the leader 610 is aware of. The leader 608, not being aware of any dependencies either, responds with an agreement 624 that the transaction B can be committed without requiring any other transactions to be committed first. The leader 606, which has already agreed to commit the transaction A, instead responds, in a communication 626, that the transaction B is dependent on a set of transactions of which A is the only member (indicated by the notation "B→{A}"). Since only a minority of the leaders 602-610 agree that B can be immediately committed, the leader 610 does not commit B at this point.

In operation 628, the leader 610 accepts the transaction B. The transaction B can be accepted instead of pre-accepted, because the leader 610 has already (through the pre-accept requests 622) determined that a majority of the leaders 602-610 agree that the dependency set contains only the transaction A. Accordingly, the leader 610 sends accept requests 630 to each of the other leaders 602-608, wherein the accept requests 630 indicate that the transaction B is dependent on the transaction A. Accordingly, the recipients of the accept requests 630 will not commit the transaction B until they have committed the transaction A, even if they have not yet received an accept or pre-accept request for the transaction A (as may be the case with the leader 608 in the example shown). The recipient leaders each respond with an acknowledgment 632 of the accept request 630. Once a majority of the leaders 602-610 have acknowledged the accept requests 630, the leader 610 commits the transaction B (with a dependency on A) in operation 634 and sends asynchronous commit messages to the other leaders 602-608.

In operation 636, the leader 602 pre-accepts a transaction C. The leader 602 sends pre-accept requests 638 to each of the other leaders 604-610. The pre-accept requests 638 indicate that the transaction C is dependent on the transaction A, since the leader 602 is not aware of the transaction B at this point. The leaders 604 and 606, being aware of the transaction B, each respond with a communication 640, indicating that the transaction C can only be committed after the transactions A and B are committed (indicated by the notation "C→{A,B}"). Once the leader 602 expands its dependency set based on the communications 640, three of the five leaders agree on the dependency set. Since this is a majority, the leader 602 can commit the transaction C (with a dependency on A and B) in operation 642 and send asynchronous commit messages to the other leaders 604-610.

In this way, no transactions are committed by any of the leaders 602-610 unless a majority of the leaders 602-610 agree to the order of the transaction. When implemented in the hierarchical scheme of FIG. 1 and in conjunction with the communications of FIG. 5, no global acknowledgment communication 575 will be sent to a client 410 until global consensus has been reached as to the order of the transactions.

Figure 7:
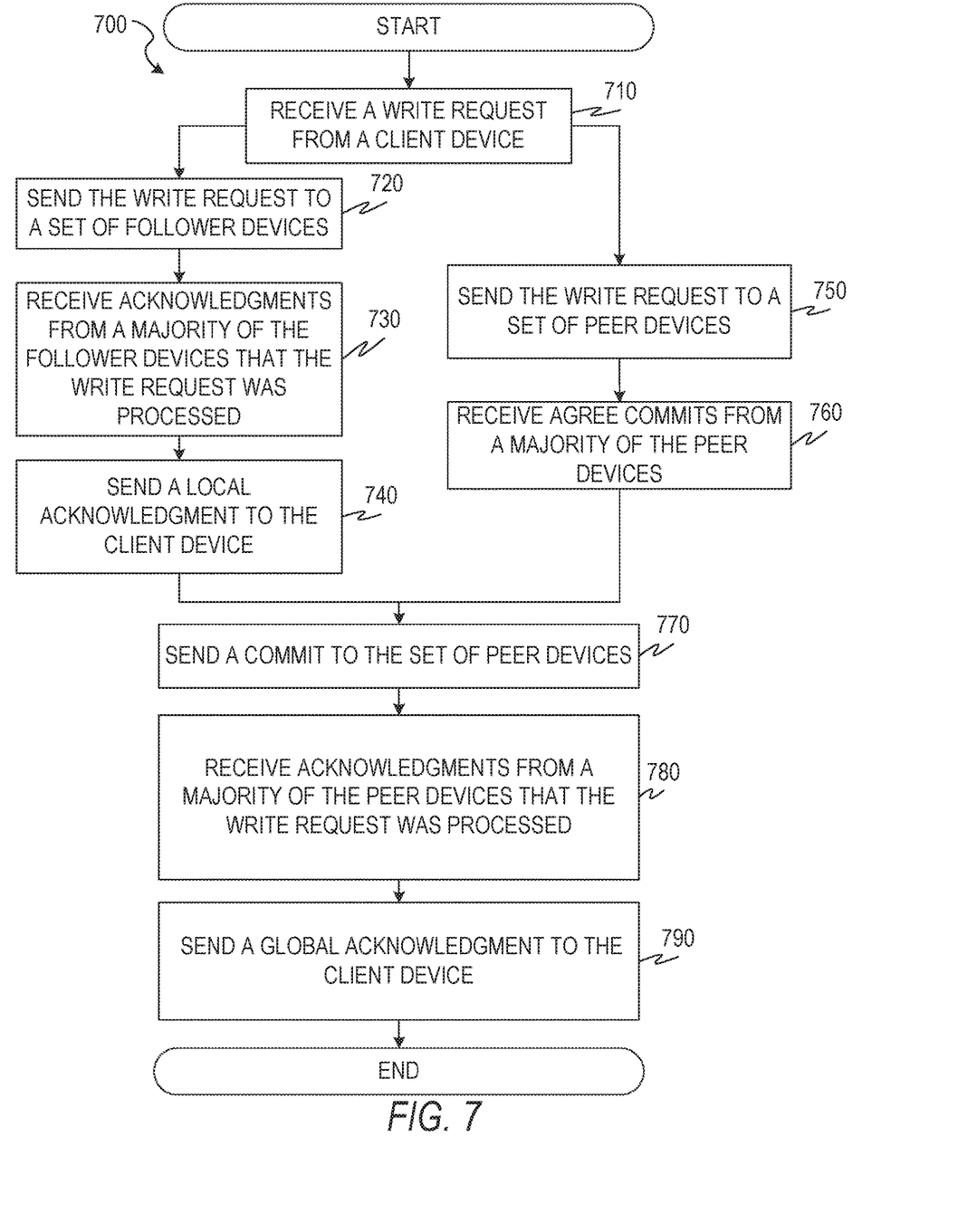
FIG. 7 is a flowchart illustration of a method of implementing a cross-data center hierarchical consensus scheme with geo-aware leader election, according to some example embodiments.

FIG. 7 is a flowchart illustration of a method 700 of implementing a cross-data center hierarchical consensus scheme with geo-aware leader election, according to some example embodiments. The method 700 includes operations 710-790 and is described, by way of example and not limitation, as being performed by the server 110A of FIG. 1 and the client 410 of FIG. 4.

In operation 710, a leader (e.g., the server 110A) receives a write request from a client device (e.g., the client 410). The leader sends the write request to a set of follower devices (e.g., the servers 110B and 110C) in operation 720 and sends the write request to a set of peer devices that are the leaders of other clusters (e.g., leaders of other rafts) in operation 750. The cluster-wise consensus starts to process among the leaders of the other clusters. As shown in FIG. 7, the operations of achieving consensus in the local cluster of the leader that received the write request (operations 720-740) may be performed in parallel with the operations of achieving consensus among clusters (operations 750-780). In some example embodiments, local consensus is achieved prior to attempting global consensus.

In operation 730, the leader receives acknowledgments from a majority of the follower devices that the write request was processed, thus determining that local consensus has been achieved. In response to determining that local consensus has been achieved, the leader sends a local acknowledgment to the client device (operation 740).

In operation 760, the leader receives agreement (e.g. 616) acknowledgments from a majority of the peer devices that agree with the dependencies of the request. In response to the determination that local consensus was reached and the acknowledgments from the majority of the peer devices, the leader sends asynchronous write commit messages (e.g. 618, 634, 642) to the set of peer devices (operation 770).

The leader receives acknowledgments from a majority of the peer devices that the write request was processed (in response to the write commit message) in operation 780, thus determining that global consensus has been achieved among the clusters. Based on the determination that global consensus has been achieved, the leader sends a global acknowledgment to the client device in operation 790, confirming that the write request received in operation 710 has been fully processed.

Figure 8:
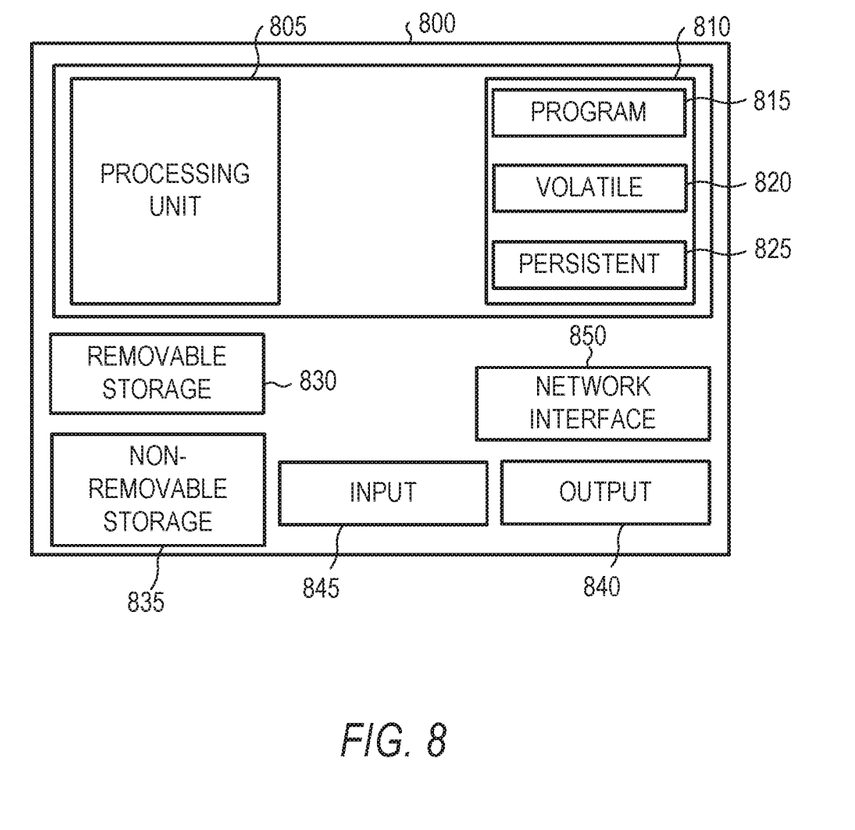
FIG. 8 is a block diagram illustrating circuitry for clients, servers, and cloud-based resources for implementing algorithms and performing methods, according to example embodiments.

FIG. 8 is a block diagram illustrating circuitry for clients, servers, and cloud-based resources for implementing algorithms and performing methods according to example embodiments. All components need not be used in various embodiments. For example, the clients, servers, and cloud-based network resources may each use a different set of components, or in the case of servers for example, larger storage devices.

One example computing device in the form of a computer 800 may include a processing unit 805, memory 810, removable storage 830, and non-removable storage 835. Although the example computing device is illustrated and described as the computer 800, the computing device may be in different forms in different embodiments. For example, the computing device may instead be a smartphone, a tablet, a smartwatch, or another computing device including the same or similar elements as illustrated and described with regard to FIG. 8. Devices, such as smartphones, tablets, and smartwatches, are generally collectively referred to as "mobile devices" or "user equipment". Further, although the various data storage elements are illustrated as part of the computer 800, the storage may also or alternatively include cloud-based storage accessible via a network, such as the Internet, or server-based storage.

The memory 810 may include volatile memory 820 and persistent memory 825, and may store a program 815. The computer 800 may include—or have access to a computing environment that includes—a variety of computer-readable media, such as the volatile memory 820, the persistent memory 825, the removable storage 830, and the non-removable storage 835. Computer storage includes random access memory (RAM), read-only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

The computer 800 may include or have access to a computing environment that includes input 845, output 840, and a network interface 850. The output 840 may include a display device, such as a touchscreen, that also may serve as an input device. The input 845 may include one or more of a touchscreen, a touchpad, a mouse, a keyboard, a camera, one or more device-specific buttons, one or more sensors integrated within or coupled via wired or wireless data connections to the computer 800, and other input devices. The computer 800 may operate in a networked environment using a network interface to connect to one or more remote computers, such as database servers. The network interface 850 provides a wired or wireless hardware connection between the computer 800 and a network. The remote computer may include a personal computer (PC), server, router, network PC, peer device or other common network node, or the like. The network connected to via the network interface 850 may include a Local Area Network (LAN), a Wide Area Network (WAN), a cellular network, a WiFi network, a Bluetooth network, or other networks.

Computer-readable instructions stored on a computer-readable medium (e.g., the program 815 stored in the memory 810) are executable by the processing unit 805 of the computer 800. A hard drive, CD-ROM, or RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example.

In one example embodiment, the computer 800 includes a non-transitory memory storage 810 comprising instructions 815, a network interface 850, and one or more processors 805 in communication with the memory storage 810 and the network interface 850. The one or more processors 805 execute the instructions 815 to receive, via the network interface 850, a write request from a client device, send, via the network interface 850, the received write request to a set of follower devices, receive, via the network interface 850, a first acknowledgment from each follower device of the set of follower devices that the write request was processed, send, via the network interface 850, the received write request to a set of peer devices in response to the receipt of the first acknowledgments, receive, via the network interface 850, second acknowledgments from a majority of the set of peer devices that the write request was processed, and send an acknowledgment of the write request to the client device in response to the receipt of the second acknowledgments.

Devices and methods disclosed herein may reduce time, processor cycles, and power consumed in achieving consensus between or among multiple data centers. Additionally, when consensus is more rapidly achieved, memory usage and disk accesses may be reduced by a reduction in temporary storage of intermediate results.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A device comprising:
   a non-transitory memory storage comprising instructions;
   a network interface; and
   one or more processors in communication with the memory storage and the network interface, wherein the one or more processors execute the instructions to:
   receive, via the network interface, a write request from a client device;
   send, via the network interface, the received write request to a set of follower devices;
   receive, via the network interface, first acknowledgments from a majority of follower devices of the set of follower devices that the write request was processed; and
   based on the receipt of the first acknowledgments, send, via the network interface, the received write request to a set of peer devices different from the set of follower devices.

2. The device of claim 1, wherein the one or more processors further execute the instructions to:
   receive, via the network interface, write commits from a first majority of the set of peer devices;
   send, via the network interface, a commit request to the set of peer devices in response to the receipt of the write commits;
   receive, via the network interface, second acknowledgments from a second majority of the set of peer devices that the write request was processed;
   prior to receiving at least one of the second acknowledgments:
   receive, via the network interface, from a first peer device of the set of peer devices, a prior write request;
   process the prior write request;
   send, via the network interface, an acknowledgment of the prior write request; and
   send an acknowledgment of the write request to the client device in response to the receipt of the first acknowledgments and the second acknowledgments.

3. The device of claim 1, wherein the one or more processors further execute the instructions to:
   receive, via the network interface, leader requests from a second majority of follower devices of the set of follower devices; and
   become a replacement leader device based on the receipt of the leader requests.

4. The device of claim 1, wherein the one or more processors further execute the instructions to:
   determine that a leader device is not available based on detecting that a heartbeat signal from the leader device has not been received.

5. The device of claim 1, wherein the one or more processors further execute the instructions to:
   determine that a leader device is not available;
   send, via the network interface, first usage data to each follower device of the set of follower devices;
   receive, via the network interface, second usage data from each follower device of the set of follower devices;
   receive, via the network interface, first leader requests from less than a majority of the follower devices of the set of follower devices;
   resend, via the network interface, the first usage data to each follower device of the set of follower devices in response to an elapse of a predetermined period of time without detecting a message from a replacement leader device;
   receive, via the network interface, second leader requests from a second majority of the follower devices of the set of follower devices; and
   become a replacement leader device based on the first usage data, the second usage data, and the receipt of the second leader requests.

6. The device of claim 2, wherein:
   an average geographic distance from the device to each of the follower devices of the set of follower devices is less than an average geographic distance from the device to each of the peer devices of the set of peer devices.

7. A computer-implemented method for maintaining data consistency across multiple data centers, comprising:
   receiving, by one or more processors and via a network interface, a write request from a client device;
   sending, by the one or more processors and via the network interface, the received write request to a set of follower devices;
   receiving, by the one or more processors and via the network interface, first acknowledgments from a majority of follower devices of the set of follower devices that the write request was processed; and
   based on the receipt of the first acknowledgments, sending, by the one or more processors and via the network interface, the received write request to a set of peer devices different from the set of follower devices.

8. The method of claim 7, further comprising:
   receiving, by the one or more processors and via the network interface, write commits from a first majority of the set of peer devices;
   in response to the receipt of the write commits, sending, by the one or more processors and via the network interface, a commit request to the set of peer devices;

receiving, by the one or more processors and via the network interface, second acknowledgments from a second majority of the set of peer devices that the write request was processed;
prior to receiving at least one of the second acknowledgments:
receiving, via the network interface, from a first peer device of the set of peer devices, a prior write request;
processing the prior write request; and
sending, via the network interface, an acknowledgment of the prior write request; and
in response to the receipt of the first acknowledgments and the second acknowledgments, sending an acknowledgment of the write request to the client device.

9. The method of claim 7, further comprising:
receiving, via the network interface, leader requests from a second majority of follower devices of the set of follower devices; and
becoming a replacement leader device based on the receipt of the leader requests.

10. The method of claim 7, further comprising determining that a leader device is not available based on detecting that a heartbeat signal from the leader device has not been received.

11. The method of claim 7, further comprising:
determining, by the one or more processors, that a leader device is not available;
sending, via the network interface, first usage data to each follower device of the set of follower devices;
receiving, via the network interface, second usage data from each follower device of the set of follower devices; and
receiving, via the network interface, first leader requests from less than a majority of the follower devices of the set of follower devices;
in response to an elapse of a predetermined period of time without detecting a message from a replacement leader device, resending, via the network interface, the first usage data to each follower device of the set of follower devices;
receiving, via the network interface, second leader requests from a second majority of the follower devices of the set of follower devices; and
becoming a replacement leader device based on the first usage data, the second usage data, and the receipt of the second leader requests.

12. The method of claim 8, wherein:
an average geographic distance from the network interface to each of the follower devices of the set of follower devices is less than an average geographic distance from the network interface to each of the peer devices of the set of peer devices.

13. A non-transitory computer-readable medium storing computer instructions that, when executed by one or more processors, cause the one or more processors to perform steps of:
receiving, via a network interface, a write request from a client device;
sending, via the network interface, the received write request to a set of follower devices;
receiving, via the network interface, first acknowledgments from a majority of follower devices of the set of follower devices that the write request was processed; and
based on the receipt of the first acknowledgments, sending, via the network interface, the received write request to a set of peer devices different from the set of follower devices.

14. The non-transitory computer-readable medium of claim 13, wherein the steps further comprise:
receiving, by the one or more processors and via the network interface, write commits from a first majority of the set of peer devices;
in response to the receipt of the write commits, sending, via the network interface, a commit request to the set of peer devices;
receiving, via the network interface, second acknowledgments from a second majority of the set of peer devices that the write request was processed;
prior to receiving at least one of the second acknowledgments:
receiving, via the network interface, from a first peer device of the set of peer devices, a prior write request;
processing the prior write request; and
sending, via the network interface, an acknowledgment of the prior write request; and
in response to the receipt of the first acknowledgments and the second acknowledgments, sending an acknowledgment of the write request to the client device.

15. The non-transitory computer-readable medium of claim 13, wherein the steps further comprise:
receiving, via the network interface, leader requests from a second majority of follower devices of the set of follower devices; and
becoming a replacement leader device based on the receipt of the leader requests.

16. The non-transitory computer-readable medium of claim 13, wherein the steps further comprise:
determining that a leader device is not available based on detecting that a heartbeat signal from the leader device has not been received.

17. The non-transitory computer-readable medium of claim 13, wherein the steps further comprise:
determining that a leader device is not available;
sending, via the network interface, first usage data to each follower device of the set of follower devices;
receiving, via the network interface, second usage data from each follower device of the set of follower devices;
receiving, via the network interface, first leader requests from less than a majority of the follower devices of the set of follower devices;
in response to an elapse of a predetermined period of time without detecting a message from a replacement leader device, resending, via the network interface, the first usage data to each follower device of the set of follower devices;
receiving, via the network interface, second leader requests from a second majority of the follower devices of the set of follower devices; and
becoming a replacement leader device based on the first usage data, the second usage data, and the receipt of the second leader requests.

18. The device of claim 1, wherein the one or more processors further execute the instructions to:
become a leader device based on first usage data that comprises a number of requests in a time period.

19. The device of claim 1, wherein the one or more processors further execute the instructions to:

become a leader device based on first usage data that comprises a number of different client devices originating requests in a time period.

20. The device of claim 1, wherein the one or more processors further execute the instructions to:

become a leader device based on first usage data that comprises a number of high-priority devices originating requests in a time period.

* * * * *